UNITED STATES PATENT OFFICE.

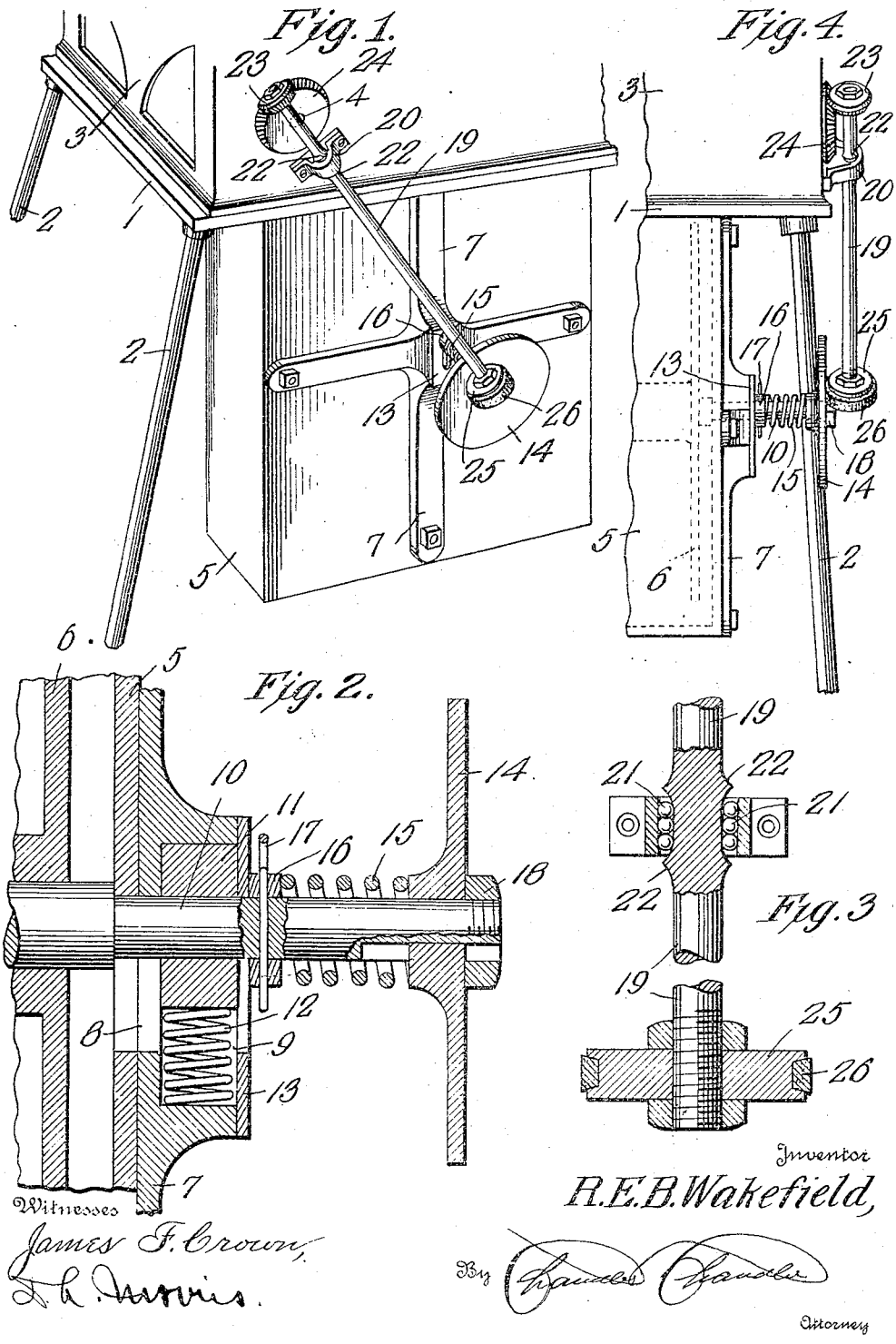

RICHARD E. B. WAKEFIELD, OF WASHINGTON, DISTRICT OF COLUMBIA, ASSIGNOR OF ONE-HALF TO DONALD U. RICH, OF WASHINGTON, DISTRICT OF COLUMBIA.

MOTION-PICTURE-PROJECTING APPARATUS.

1,284,499. Specification of Letters Patent. Patented Nov. 12, 1918.

Application filed April 19, 1916. Serial No. 92,118.

*To all whom it may concern:*

Be it known that I, RICHARD E. B. WAKEFIELD, a citizen of the United States, residing at Washington, in the District of Columbia, have invented certain new and useful Improvements in Motion-Picture-Projecting Apparatus; and I do hereby declare the following to be a full, clear, and exact description of the invention, such as will enable others skilled in the art to which it appertains to make and use the same.

This invention relates to a motion picture projecting apparatus.

In the projecting apparatus used, commercially, at the present time there are certain inherent faults in the take-up mechanism for the film. For instance in one machine which is within my knowledge a disk is secured to the lower or take-up reel shaft and a belt pulley, which is driven by a suitable belt, is slidably mounted on the shaft and rotatable independently thereof. This pulley is pressed into an engagement with the disk by a spring so that when the weight of the film on the take-up reel becomes so great that an undue strain is applied to the film between the reels, the pulley will slip and relieve the strain. When the pulley again engages the disk the lower reel will start suddenly and will thus. oft times, break the film. Furthermore, upon the disengagement of the pulley from the disk, the take-up reel will suddenly stop while the upper reel will continue its movement and consequently the film will unwind therefrom and lie loose between the reels, causing not only a disarrangement of the film but also placing the film in such position that, when the pulley again engages the lower or take-up reel, the movement of the reel will be rapid, inasmuch as there is no resistance, the film being loose. When, however, this slack is taken up in the film it will become suddenly taut and there will be a tendency for it to break. Furthermore, under the most ideal conditions, a great strain will be transmitted through the film to the entire mechanism and this strain will increase as the weight of the film on the take-up reel increases.

Similar defects, which need not be here enumerated, may be found in other machines wherein the take-up mechanism is similar to if not the equivalent of the mechanism described.

In contra-distinction to the above referred to mechanism, I have provided means for winding the film on the take-up reel so that the strain on the film will be relieved and so that, as the weight of the film on the take-up reel increases, the speed of the reel will proportionately decrease. Furthermore I have provided a positive drive for the take-up reel which, together with the change of speed, will obviate the defects above enumerated in connection with the commercial apparatus referred to.

It is therefore an object of my invention to so construct the device that the speed of the take-up reel will decrease proportionately with the increase of the weight of the film on the reel and to provide a device which will relieve the film of strain and will take up the same consistently.

It is a further object of my invention to provide a comparatively simple device, for accomplishing the purposes which may be attached to the machines used, commercially, at the present time.

With these and other objects in view, such as will appear as my description progresses, my invention comprises the combination and arrangement of parts as set forth in and falling within the scope of the appended claim.

In the drawing:

Figure 1 is a perspective view of a portion of a projecting apparatus showing my device in place thereon, only such portions of the apparatus being shown, however, as are necessary to illustrate the coöperation of my device therewith;

Fig. 2 is a fragmental sectional view showing the manner in which the lower or take-up reel is mounted;

Fig. 3 is a sectional view through the friction disks, showing the manner in which each is mounted, and Fig. 4 is an elevational view looking at the edges of the disks and drive gears.

In the drawings I have illustrated a portion of a projecting apparatus which includes a table 1, which is supported by legs 2, and a frame 3, which is supported on the table 1, and in which is mounted the projecting mechanism, only the take-up drive shaft 4 of this mechanism being shown. The apparatus includes also a magazine 5 in which the take-up reel is mounted in a manner later to be described.

In order that the said reel, which is indicated by the reference character 6, may be automatically lowered as the weight of the film increases, I have mounted a spider 7 on the closed side of the magazine 5. This spider is provided with a slot 8 and with a chamber 9. The shaft 10 of the reel 6 extends through the slot 8 in the spider and the end of the shaft finds a bearing in a block 11 which is slidable vertically in the chamber 9, being urged to the upper end of the chamber by a spring 12 and maintained within the chamber by a suitable cover 13.

The tension of the spring 12 bears a fixed ratio to the weight of the film so that when a predetermined amount of the film is wound upon the reel 6, the spring 12 will permit the reel to move downwardly a predetermined distance. A friction disk 14 is mounted on one end of the reel shaft 10 so that it will rotate therewith but is slidable thereon. This disk is normally urged toward the end of the shaft 10 by a spring 15, which encircles the shaft and is interposed between the disk and an adjustable collar 16, which may be secured to the shaft at various points by a cotter pin 17 so that the tension of the spring 15 may be varied. This disk is prevented from being displaced by a nut 18 which is mounted on the end of a shaft 10. A take-up shaft 19 is mounted in a suitable bearing 20 on the magazine 5, the bearing being provided with anti-friction balls 21 and the shaft being provided with shoulders 22 to prevent any longitudinal movement of the shaft. Mounted on the upper end of this shaft 19, is a spur gear 23 which meshes with a beveled gear 24 which is secured to the end of the drive shaft 4. It is, of course, to be understood that any other suitable gear may be substituted for this particular gearing which is shown and described, so long as it performs substantially the same function. A friction disk 25 is secured to the lower end of the take-up shaft 19 and this disk 25 is provided with a leather band 26 which is mounted in a suitable groove in the periphery of the disk and which contacts with the face of the disk 14. Thus when the shaft 19 is rotated through the gears 23 and 24, during the winding of the film upon the reel, the disk 14 is likewise rotated, the rotation of which latter disk causes, in fact, the movement of the reel 6. As the weight of the film on the reel 6 increases the center of the disk 14 will move away from the point of contact between the disk 14 and the disk 25 and consequently the speed of the disk 14 and the reel will be decreased.

It will thus be seen that I have provided a take-up mechanism by means of which the film will be wound upon the take-up reel at a constant speed and will be subjected to a constant tension. Furthermore I have constructed the device so that the rate of rotation of the take-up reel will be decreased as the weight of the film thereon increases and I have so constructed the mechanism that, should the film for any reason not be fed, it will not become broken.

While I have illustrated and described a particular embodiment of my invention, it has merely been for the sake of convenience and I do not wish to be limited to that particular embodiment as it is obvious that numerous changes may be made in the details of construction without departing from the spirit of the invention or exceeding the scope of the appended claim.

What I claim is:

In a motion picture projecting apparatus the combination with a spider having a slot arranged centrally therein, said spider being secured centrally to a side of a take-up reel magazine, of a vertically movable driven shaft extending through said slot and into said reel magazine, a vertically movable bearing block arranged to support said driven shaft, a coil spring disposed beneath said bearing block for yieldingly supporting the same, a longitudinally movable friction disk carried by said driven shaft, a collar fixedly secured to said driven shaft, a coil spring carried by said shaft and interposed between said disk and collar, a take-up shaft having driven connection with said drive shaft, a friction disk secured to said take-up shaft, the last named friction disk having engagement with the first named friction disk and being arranged to move radially upon the face of the first mentioned disk upon the vertical movement of said driven shaft, the first named disk being maintained in frictional engagement with the last named disk by the last named spring.

In testimony whereof, I affix my signature in the presence of two witnesses.

RICHARD E. B. WAKEFIELD.

Witnesses:
WILLIAM J. WEBER,
LEE SANFORD.

Copies of this patent may be obtained for five cents each, by addressing the "Commissioner of Patents, Washington, D. C."